United States Patent
Weng et al.

(10) Patent No.: US 9,667,742 B2
(45) Date of Patent: May 30, 2017

(54) SYSTEM AND METHOD OF CONVERSATIONAL ASSISTANCE IN AN INTERACTIVE INFORMATION SYSTEM

(71) Applicant: Robert Bosch GmbH, Stuttgart (DE)

(72) Inventors: Fuliang Weng, Mountain View, CA (US); Zhongnan Shen, Milpitas, CA (US); Zhe Feng, Mountain View, CA (US); Kui Xu, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 912 days.

(21) Appl. No.: 13/940,934

(22) Filed: Jul. 12, 2013

(65) Prior Publication Data
US 2014/0019522 A1    Jan. 16, 2014

Related U.S. Application Data

(60) Provisional application No. 61/670,934, filed on Jul. 12, 2012.

(51) Int. Cl.
| | |
|---|---|
| *G06F 15/16* | (2006.01) |
| *H04L 29/08* | (2006.01) |
| *G06N 5/02* | (2006.01) |
| *G06N 5/04* | (2006.01) |
| *G06F 17/30* | (2006.01) |

(52) U.S. Cl.
CPC ........ *H04L 67/32* (2013.01); *G06F 17/30964* (2013.01); *G06N 5/02* (2013.01); *G06N 5/043* (2013.01); *H04L 67/12* (2013.01)

(58) Field of Classification Search
CPC ........................... H04L 67/32; G06F 17/30964

USPC .................. 709/202–203, 217–219
See application file for complete search history.

(56) References Cited

U.S. PATENT DOCUMENTS

| | | | |
|---|---|---|---|
| 6,088,731 A | 7/2000 | Kiraly et al. | |
| 6,735,632 B1 | 5/2004 | Kiraly et al. | |
| 7,036,128 B1 | 4/2006 | Julia et al. | |
| 7,392,540 B1 * | 6/2008 | Pell .......................... | H04L 67/02 709/203 |
| 7,424,363 B2 | 9/2008 | Cheng et al. | |

(Continued)

OTHER PUBLICATIONS

Website page, "ESRI ArcGIS Desktop Ink tool", http://webhelp.esri.com/arcgiSDEsktop/9.3/index.cfm?TopicName=Pen_tool; published at least as early as Jul. 12, 2013 (3 pages).

(Continued)

*Primary Examiner* — Bharat N Barot
(74) *Attorney, Agent, or Firm* — Maginot Moore & Beck LLP

(57) ABSTRACT

A method of providing information assistance services includes generating a plurality of service requests for a plurality of request elements that are generated from a single client request received by a processor. The service requests are sent to both software application service providers that are executed by the processor and remote service providers that are connected to the local processor through a data network. The processor receives a plurality of service responses from the service providers, generating at least one output message element corresponding to the service responses, and sending the output message data to at least one output device that is operatively connected to the processor to produce a response to the client request.

13 Claims, 6 Drawing Sheets

(56) References Cited

U.S. PATENT DOCUMENTS

| | | | |
|---|---|---|---|
| 7,480,546 B2* | 1/2009 | Kamdar | G06F 17/289 |
| | | | 701/1 |
| 7,483,832 B2 | 1/2009 | Tischer | |
| 7,577,522 B2 | 8/2009 | Rosenberg | |
| 7,657,368 B2* | 2/2010 | Weiss | G01C 21/34 |
| | | | 709/219 |
| 7,716,056 B2 | 5/2010 | Weng et al. | |
| 7,729,825 B2 | 6/2010 | Chigusa | |
| 7,783,492 B2 | 8/2010 | Bangalore et al. | |
| 7,831,384 B2 | 11/2010 | Bill | |
| 7,925,995 B2 | 4/2011 | Krumm et al. | |
| 2003/0046087 A1 | 3/2003 | Johnston et al. | |
| 2005/0197991 A1 | 9/2005 | Wray et al. | |
| 2009/0037832 A1 | 2/2009 | Falchuk et al. | |
| 2010/0070448 A1 | 3/2010 | Omoigui | |
| 2010/0241431 A1 | 9/2010 | Weng et al. | |
| 2010/0250647 A1* | 9/2010 | Rajan | G06F 17/30893 |
| | | | 709/203 |
| 2011/0029514 A1 | 2/2011 | Kerschberg et al. | |
| 2011/0040772 A1 | 2/2011 | Sheu | |
| 2011/0145507 A1* | 6/2011 | Ramamurthy | G06Q 10/00 |
| | | | 711/137 |
| 2012/0016678 A1 | 1/2012 | Gruber et al. | |
| 2012/0022872 A1 | 1/2012 | Gruber et al. | |
| 2012/0242482 A1 | 9/2012 | Elumalai et al. | |
| 2012/0245944 A1 | 9/2012 | Gruber et al. | |
| 2012/0265535 A1 | 10/2012 | Bryant-Rich et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0117022 A1 | 5/2013 | Chen et al. | |
| 2013/0176328 A1 | 7/2013 | Pillai | |
| 2013/0226369 A1* | 8/2013 | Yorio | G06F 17/00 |
| | | | 701/1 |
| 2014/0200760 A1* | 7/2014 | Kaufmann | H04W 12/06 |
| | | | 701/29.3 |
| 2015/0280937 A1* | 10/2015 | Sadhu | H04L 12/2827 |
| | | | 709/217 |

OTHER PUBLICATIONS

Website page, "Google gesture search API", http://gesturesearch.googlelabs.com/api.html; published at least as early as Jul. 12, 2013 (3 pages).

Website page, "Mindjet MindManager Pen Mode gestures", http://onlinehelp.mindjet.com/mm72Help/ENU/Pro/pen_mode_gestures.htm; published at least as early as Jul. 12, 2013 (2 pages).

Website page, "AT&T Speak4It iPad/IPhone application", http://www.speak4it.com; published at least as early as Jul. 12, 2013 (3 pages).

Website page, "Yahoo Sketch-a-Search iPhone application", http://ycorpblog.com/2010/03/23/sketch-a-search; published at least as early as Jul. 12, 2013 (1 page).

Feld, Michael et al., The Automotive Ontology: Managing Knowledge Inside the Vehicle and Sharing it Between Cars, Published at least as early as Jul. 11, 2012 (8 pages).

Get iPhone like Location-based Reminders on your Android Phone, http://www.labnol.org/software/location-based-reminders/19925, Published at least as early as Jul. 11, 2012 (2 pages).

TomTom GO Live 1535M Review (Review #1), http://reviews.cnet.com/car-gps-navigation/tomtom-go-live-1535m/4505, Published at least as early as Jul. 11, 2012 (6 pages).

TomTom GO Live 1535M Review (Review #2), http://reviews.cnet.com/car-gps-navigation/tomtom-go-live-1535m/4505, Published at least as early as Jul. 11, 2012 (4 pages).

International Search Report and Written Opinion corresponding to PCT Application No. PCT/US2013/050330, mailed Apr. 8, 2014 (13 pages).

* cited by examiner

SYSTEM AND METHOD OF CONVERSATIONAL ASSISTANCE IN AN INTERACTIVE INFORMATION SYSTEM

CLAIM OF PRIORITY

This application claims priority to U.S. Provisional Application No. 61/670,934, which is entitled "System And Method Of Conversational Assistance For Automated Tasks With Integrated Intelligence," and was filed on Jul. 12, 2012.

FIELD

This disclosure relates generally to the field of automated assistance and, more specifically, to systems and methods for recognizing user requests that are submitted with multiple input modes in automated assistance systems.

BACKGROUND

Intelligent assistance systems have received broad attention due to the demand of end users who simply do not want to follow too many pre-defined specific steps to get their tasks done. These users also do not want to find solutions and then have to organize the solutions into a total solution for resolution of their problems. Examples of such assistance systems include trip planning, schedule management, airline reservation, parking spot procurement, gas station search, or restaurant reservation systems. Variations of intelligent assistance systems have been developed, however, the likelihood of a single intelligent system being able to solve all these problems perfectly in the near future is low. Each of the variations typically has its own focused areas and special features. For example, context-aware query services can include features directed to specific application such as Address Book, Calendar, Music, and Web search.

Intelligent assistance systems can be implemented with a wide range of hardware and software platforms including, but not limited to, mobile electronic devices, such as smartphones, tablets, other portable computers, and information and entertainment systems, which are integrated with automotive vehicles, public kiosks, such as kiosks found in hotels and airports, and through any appropriate computing device that is connected to the Internet. Some information assistance systems rely on externally stored data and/or processing to perform a task. For example, some online information assistance services provide an interface using a smartphone, but one or more remote server devices store data and perform processing to generate the results for a query that is submitted to the service. The remote servers are sometimes referred to as a "cloud" service because the data and processing for the information assistance system is implemented, at least partially, by remote computing devices that are not under the direct control of the end user.

One example of an existing intelligent assistance system uses personal route knowledge to adapt navigation instructions so that the drivers are overwhelmed by the navigation device when driving on familiar routes. This personalization, however, is mostly focused on navigation instruction application. Other existing intelligent assistance systems include multi-modal interaction systems that enable users to draw gestures to specify regions/areas for search purposes.

While existing intelligent assistance systems can provide valuable services, the existing intelligent assistance systems are typically configured to provide a limited number of services under the discretion of a single service provider. The existing services do not provide a configurable and modular architecture to enable new service providers and forms of intelligent assistance to be provided to end users with minimal configuration. Existing intelligent assistance systems can only be used individually and do not integrate with other intelligent assistance systems, which means that an end user must either use only one intelligent assistance system or learn disparate user interfaces and switch between different intelligent assistance systems in order to receive assistance for different tasks. Thus, an improved intelligent assistance architecture, which enables efficient deployment of new intelligent assistance functions and provides end users with a unified interface via natural modalities such as speech and gesture for using the intelligent assistance services, is desirable.

SUMMARY

In one embodiment, a method of providing information assistance services has been developed. The method includes receiving a single client request with a processor, generating a plurality of request elements with reference to the single client request and at least one ontology stored in a memory operatively connected to the processor, generating a plurality of service requests with the processor, the plurality of service requests corresponding to the plurality of request elements, sending at least one generated service request in the plurality of service requests to at least one data service provider in a first plurality of data service providers that are software programs executed by the processor, sending at least one other generated service request in the plurality of service requests to at least one data service provider in a second plurality of data service providers that are external data service providers communicatively coupled to the processor through a data network, receiving a plurality of service responses including a service response from each data service provider in the first plurality of data service providers and the second plurality of data service providers that received a generated service request, generating at least one integrated output message element corresponding to the service responses received from the service providers, generating output message data with reference to the at least one output message element, and sending the output message data to at least one output device that is operatively connected to the processor to produce a response to the client request.

In another embodiment, a method of providing information assistance services in a vehicle has been developed. The method includes receiving first sensor data corresponding to actions of a human driver of a vehicle with a processor operatively connected to at least one sensor in a vehicle, receiving second sensor data corresponding to an operating state of the vehicle with the processor, identifying a state of the driver in response to the first sensor data and the second sensor data, generating an output message with reference to the identified state of the driver, and choosing an appropriate timing based on user state, context and knowledge base to send the output message data to at least one output device that is operatively connected to the processor in response to the user's request or to alert the driver to the identified state.

In another embodiment, an information assistance system has been developed. The information assistance system includes at least one input device, at least one output device, a network device, a memory, and a processor operatively connected to the at least one input device, at least output device, network device and memory. The memory is configured to store at least one ontology include domain data corresponding to request elements in a client request and service requests corresponding to the request elements, and stored program instructions for a plurality of software programs that are executed by the information assistance system. The processor is configured to execute programmed instructions to receive a client request from the at least one input device, generate a plurality of request elements with reference to the single client request and the at least one ontology, generate a plurality of service requests corresponding to the plurality of request elements, send at least one generated service request in the plurality of service requests to at least one software program in the plurality of software programs executed by the processor, send at least one other generated service request in the plurality of service requests through a data network with the network device to at least one external data service provider in a plurality of data external data service providers, receive a plurality of service responses including a service response from each software program in the plurality of software programs and each data service provider in the plurality of data service providers that received a generated service request, generate at least one integrated output message element corresponding to the service responses, generate output message data with reference to the at least one output message element, and send the output message data to the at least one output device to produce a response to the client request.

DETAILED DESCRIPTION

Figure 1:
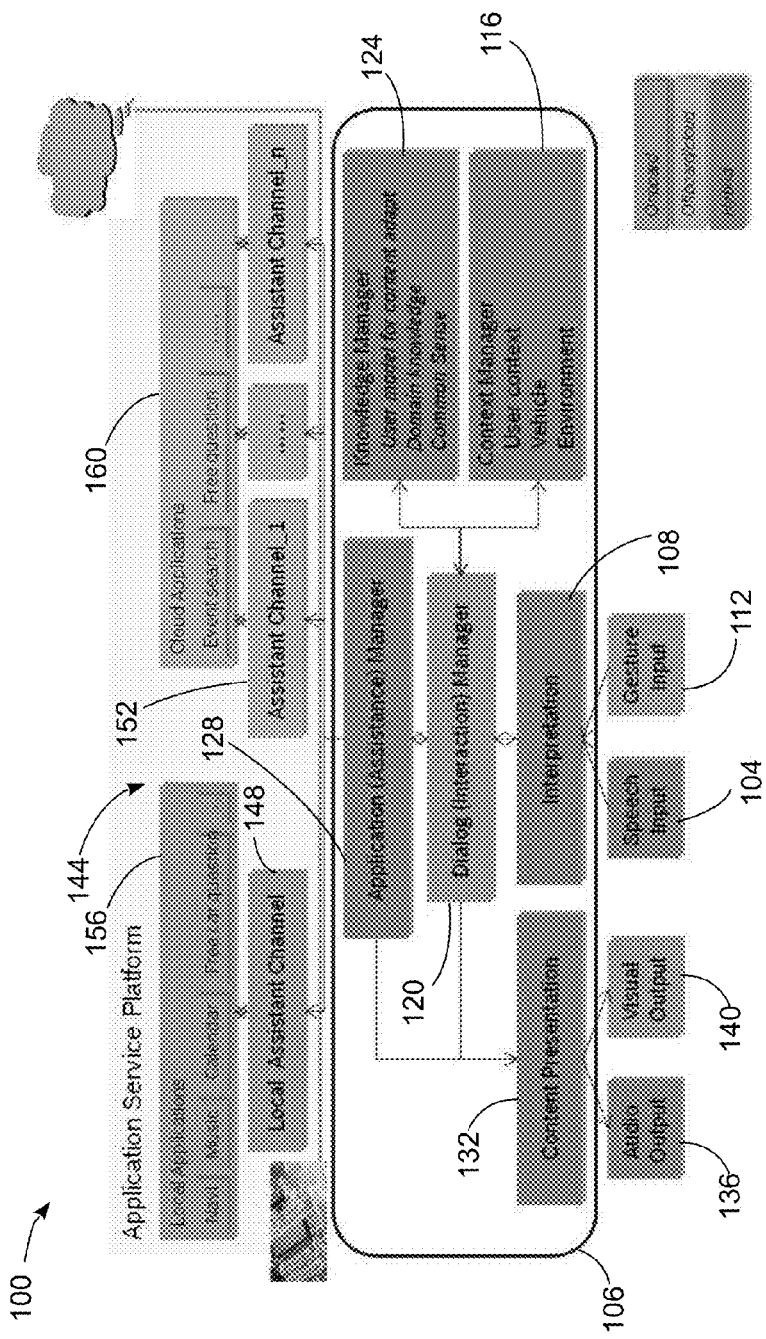
FIG. 1 is a schematic diagram of an intelligent assistance system.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

In one embodiment, an intelligent assistance system provides a holistic solution for users to interact with one or more automated systems. A user specifies geographical regions and selects geographical entities directly and naturally with both voice and gesture either made with a touchscreen or other touch input device or made with three-dimensional gestures that are recorded by a depth camera or other suitable three-dimensional gesture sensors. The user receives acoustic and visual information to guide them to complete tasks. The system includes one or more configurable and exchangeable modules that provide different services through a common interface whether they are implemented in a local device or in a remote server. For example, each module in the system can be replaced with a new module if the interfaces of the two modules are the same. One embodiment uses an XML format to define interfaces for different replaceable modules.

The intelligent assistance system can operate in a hybrid mode that includes processing on both a local computing device and in a remote network based service. A plurality of modules in the system can be configured to be implemented as an embedded local service, as a server in the network based service, or as a hybrid service with various components of the service being implemented locally and in remote servers. The intelligent assistance system incorporates with multiple intelligent assistance providers. Thus, a user can access multiple intelligent assistance providers without the need to switch between multiple software applications to access each service. When a plurality of modules, located either locally or remotely, implement a common set of functions, the integration of the results from multiple modules is implemented through statistical fusion, rule-based integration, or both. Statistical fusion integrates the results based on likelihood or confidence of the results from different modules. Rule-based integration makes use of conditional rules, which in one embodiment, specifies under what conditions a result or parts of a result from one module are taken and then combined with results or parts of a result from other modules.

The intelligent assistance system receives environmental and contextual information pertaining to the user and the device that the user operates when interacting with the information assistance system to provide environment- and context-aware dialogs with the users. For example, if the user is in a noisy environment, then the intelligent assistance system can interact with the user through touch input gestures and provide visual feedback to the user. In another example, if the user is operating a motor vehicle, then the intelligent assistance system operates in a voice activated mode with only audible feedback to avoid distracting the user. In other modes, the intelligent assistance system provides multiple modalities for interaction including voice, gesture, and pen as inputs; and voice, graphics, and haptic feedback are provided as output. The intelligent assistance system provides a consistent user interface experience through natural dialogs, instead of rigid pre-defined dialog flows. Additionally, the intelligent assistance system includes personalized user interfaces and services that adapt to the different user interaction styles of individual users.

As used herein, the term "ontology" refers to structured data that are stored in a memory corresponding to a plurality of real-world entities and relationships between the entities in one or more predetermined domains. An ontology stores information with a structure that enables computer hardware and software systems to extract information from the ontology to perform analysis and actions in response to linguistic or other unstructured input from a human operator. The predetermined corpus of information and relationships stored in the ontology enable the computer system to perform reasoning based on the context of the input from the user and the context of the domain corresponding to the ontology. In some embodiments, ontologies include a plurality of entities that correspond to real-world objects or entities in a predetermined domain of knowledge. The entities are often arranged in a hierarchy to enable classification of an entity by name or by another identifier. The relationships between entities in the ontology describe the relations and interactions between multiple entities. For example, an ontology that is directed to the domain of operation of an automobile includes entities that describe different components in the motor vehicle such as, for example, a speedometer sensor in the vehicle. The ontology associates the speedometer entity with human-understandable terms such as "speed" or "velocity" to enable an intelligent information assistance system to associate speed data from the speedometer with queries from a human operator that are related to the speed of the vehicle. The ontology also defines relationships between the speedometer and other components in the vehicle, such as an in-vehicle navigation system. The relationship between the speedometer and the in-vehicle navigation system enables an information assistance system to generate an estimate for a time of arrival using the current speed of the vehicle using information that is provided by the speedometer. Another ontology that is in a domain for restaurants and dining may include the types and sub-types of cuisines of different regions and their similarities.

Described herein is a system framework 100 that integrates different intelligent assistance systems through a single dialog system with consistent user experience. The information assistance system 100 includes the following modules as described below in conjunction with FIG. 1. The system 100 includes software and hardware components that implement a core dialog system 106. The core dialog system 106 includes an interpretation module 108, context manager, dialog manager 120, knowledge manager 124, application manager 128, and content presentation manager 132.

The speech recognition module 104 converts acoustic signals to word sequence with possible confidence scores associated with each word and the whole utterance. This module can be implemented as a local hardware or software module, as a network based service, or as a combination of both. When the module uses both local and network based sub-modules, it integrates the results into a lattice representation from the two sub-modules based on confidence values associated with the results from the two sub-modules. The lattice representation is passed onto the interpretation module 108.

The gesture recognition module 112 tracks down traces of any (e.g., pen, finger) movements and recognizes the shapes from the traces (points, lines, circles, zoom in/out, shift left/right/up/down/any direction); the traces may also be a handwriting of symbols, such as letters, digits, etc. In addition, the traces may also include trace editing functions such "erase existing traces", "enlarge or shrink existing traces", or object selection functions such as "remove an object". This module needs to reside locally to meet a "zero-latency" requirement. That is, almost no delay occurs in the display of the gesture traces when the user makes any gesture.

The interpretation module 108 converts the multi-modal symbol sequences (e.g., word sequence, shapes) into meaning representations. Meaning representations include the action(s) the user asks the system to take, the objects the action(s) needs to apply onto, and the constraints related to the objects and actions. The multi-modal symbol sequences can use a lattice for representation. The lattice can include confidence scores along with the symbol sequences from different recognition modules, which may reside locally onboard or as a remote network service.

The context management module 116 manages the dynamic information of the context, including the context used for recognizing speech, the active name lists used for recognizing proper names, the context of the active application (e.g., the current view of the map), the context of the active environment (e.g., road and traffic conditions, weather conditions, home temperature or humidity), the context of the user (e.g., the user is driving on high way, the user is making a turn onto a local street, the user is listening to music, the user is sleepy), or the context of the vehicle the user is driving (e.g., the gas tank level, the speed of the vehicle, maintenance condition). The context may be derived by accessing data from vehicle sensors, such as steering wheel for obtaining turning info, gas pedal for acceleration, or brake pedal for slowing vehicle down or making a stop. The context of the user states can also be observed by video camera, infra-red camera, microphone, or ultra-sonic sensors that monitor user's behavior: whether they are awake, talking to other people, looking at certain direction, or fatigue. The context of the environment, such as icy road, or raining, may be accessed from vehicle sensors or from connected services. The data of the context from different channels can be integrated to provide more accurate and predictive information for the driver. The dialog manager 120 uses the context and environment information from the context management module to manage the interactions with the users. For example, when a user looks for a gas station on highway, the dialog manager 120 can assign a higher priority for the stations ahead than the stations that have already been passed.

The knowledge management module 124 manages the domain/application-related knowledge including one or more ontologies corresponding to different domains for which the information assistance system provides services. For example, in a vehicle the ontologies include, but are not limited to, point of interests in navigation, ontology for the components in the vehicle, ontologies for in-vehicle entertainment services, ontologies for traffic and weather services, and the like. The knowledge manager also manages ontologies and other stored data of knowledge that is referred to as "common sense knowledge" about the world and human understanding, and specifically in the automotive domain, about activities that are related to the operation of the vehicle and understanding consequences of various actions. The common sense knowledge related to driving includes, for example, the need of occupants in the vehicle to drink water and take periodic breaks during extended journeys, that the vehicle should remain on roads that are stored in a map. The knowledge manager 124 further manages personal preferences of different users in different application domains, and information about preferred language parameters, language expressions, and user interface parameters for the users, as well as under what user states certain actions will be taken or conclusion can be made. For example, when a user is making a turn, the dialog system may need to hold on certain info and release them to the driver when the driver has the cognitive bandwidth to handle them. Alternatively, when the car is under automatic cruise control and the driver is fresh, the system may provide the driver more information. The knowledge content about a specific domain, for example, the navigation domain, can be obtained with a representation conversion from the corresponding service providers. The knowledge about the users can be constructed using the history of the past conversations between the users and the system as well as the actions the users took.

The application or service management module 128 takes a task request from the dialog/interaction manager and tries to find one or more available services that may be used to complete the task request. The available services and assistance providers are maintained in a service registry in semantic forms. This module may use automatic service decomposition to decompose the task request into atomic requests that can be solved by the service providers. The application management module then uses a service composition approach to collect the sub-solutions from these providers and complete a solution for the requested task. This module can use any external intelligent assistance systems to find a solution for the task in hand.

When multiple solutions from the service providers and assistance systems are obtained for a requested task, the application manager 128 generates a ranking recommendation based on the quality of the solutions and the past performance of these service providers and assistance systems. The recommended solutions are then passed down to the dialog manager and get presented to the users via content presentation module/TTS/visual output. After the user decides on one or more solutions and identifies these selected solutions through the dialog system, the confirmed solutions are executed. If more information is needed from the users, the dialog system communicates the required information to the users, collects the user feedback, reformulates the requirements for the task, and submits these data to the application module again for one or more new solutions. This process is repeated until either the system finds the solutions that meet the user's requirements, or the user discontinues the request refinements.

The dialog/interaction management module 120 manages the dialog between the user and the system. The dialog management module 120 takes the meaning representation from the interpretation module 108, resolving any ambiguity in the representation using the information from the context management module 116 and the knowledge management module 124, and then queries the application management module 128 for a response to the query. In case the application manager needs more information, the dialog module communicates the needed information to the content presentation module 132. If the results from different channels conflict, the dialog manager 120 performs a ranking procedure using the available knowledge from knowledge manager 124 and available context from the context manager 116. The manager informs the user if the conflicting results cannot be resolved by the system.

The content presentation module 132 converts the requested information into one or more sentences together with visual messages, such as a map, when needed to facilitate a user locating a position or selecting a number of points of interest (POIs). The one or more sentences are then sent to a text-to-speech module 136 and a visual display 140 to present the sentences to the user. The content presentation module 132 manages the format of the presentation of the information from the services or assistance channels by using audible output, visual output, or a combination of audible and visual outputs.

The Application Service Platform 144 supports the integration of local on-board applications via local on-board assistance channel 148 and remote network services via one or more remote assistance channels 152. The platform can have a copy that resides locally onboard or remotely through a data network. The application service platform provides connectivity, security, load balancing, databases, monitoring applications, user account management, billing processes or the like.

The different modules and multiple assistance systems can reside in different locations. Some of them can be placed locally in an embedded device, a mobile device, or a desktop, such as local applications 156. Other applications are offered through remote network services, such as cloud applications 160. Some information system assistance embodiments include components that are implemented as remote services. Some of the modules can be executed both locally and remotely, such as the speech recognition module, text-to-speech module, interpretation module, context management module, knowledge management module, and the application service manager, while others are preferred to be executed locally, for example, the gesture recognition module and dialog management module. The details are illustrated in FIG. 1 and FIG. 2.

Figure 2:
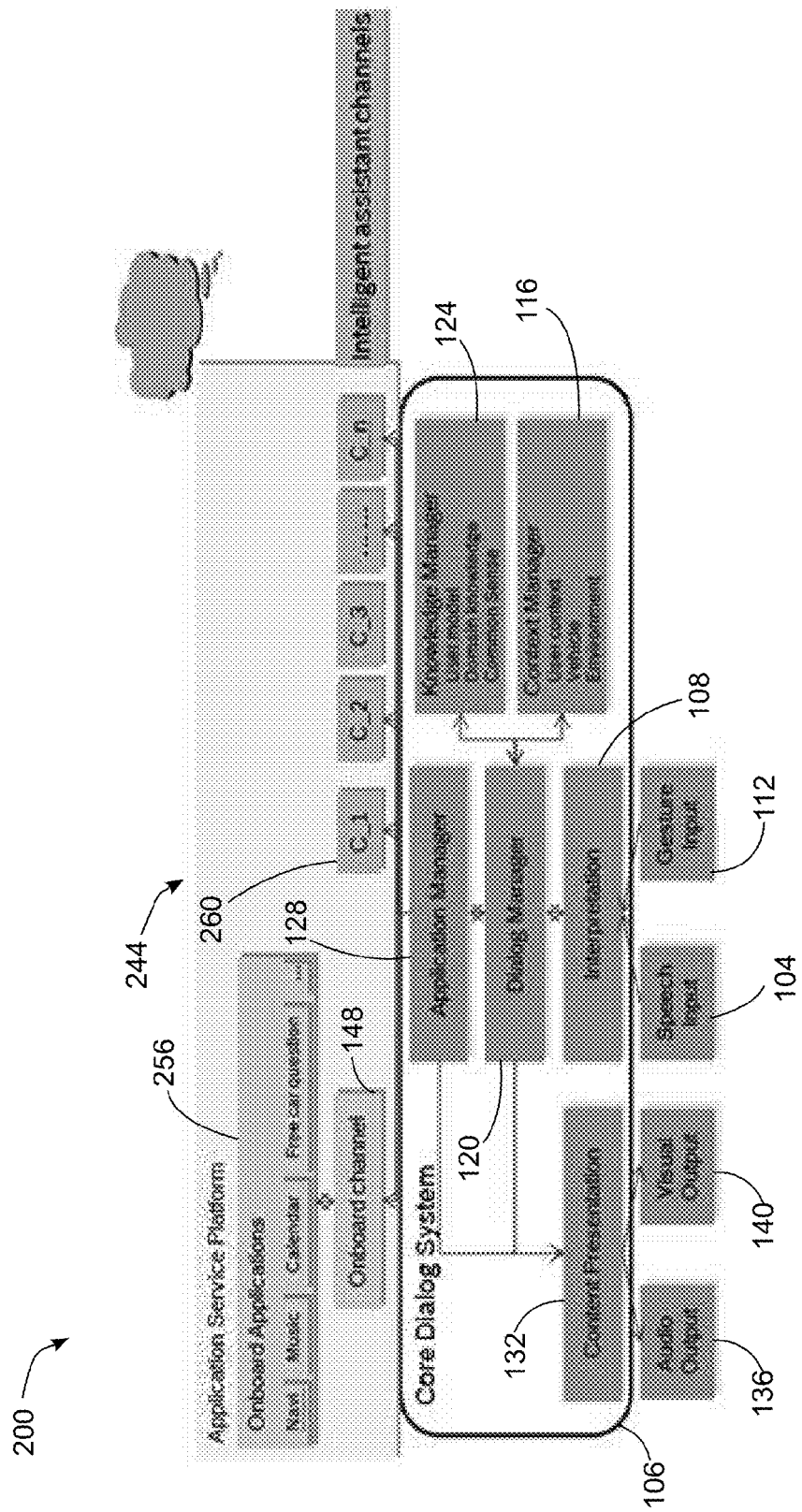
FIG. 2 is a schematic diagram of the intelligent assistance system of FIG. 1 that is configured for use in a motor vehicle.

FIG. 2 depicts an exemplary information assistance system 200 that is configured for use in a motor vehicle. The intelligent system 200 includes the components described above with reference to FIG. 1, and the intelligent system 200 is configured to provide applications that are used in a motor vehicle. For example, the application service platform 244 includes both on-board (local) applications 256 and network services 260 that provide services such as music, navigation, calendar services, and assistance for vehicle maintenance. As described above, some of the services are provided locally with an in-vehicle computing device, while the in-vehicle computing device interfaces with network services through a wireless data network to enable communication between the computing device and network-based data services. The occupants of the vehicle can interact with the system 200 using both local and cloud based information assistance applications through a unified user interface.

In one embodiment, the information assistance system 200 includes speech input 104, gesture input 112, audio output 136, and visual output 140 devices that are incorporated with the control system of a vehicle. For example, a touch-screen display that is integrated with an in-vehicle control console provides visual output with touch and gesture input. One or more touch sensitive or tactile controls that are integrated with the steering wheel provide an input device that does not require the driver to remove his or her hands from the steering wheel. Alternatively, one or more video-based or other gesture sensors installed in the ceiling of the car that are used to detect the hand gestures on the steering wheel or armrest area may realize the same effect to reduce driver distraction. Additionally, a voice recognition system enables hands-free interaction with the intelligent system 200. Some vehicle embodiments display visual information on a head-up display (HUD) system that enables the information assistance system 200 to overlay visual information with the view of the driver and passengers through the windshield or other windows in the vehicle. In another embodiment, the information assistance system 200 in the vehicle is communicatively coupled to a mobile electronic device, such as a smartphone, tablet, or notebook computer, through a wired or wireless data connection. One or more occupants in the vehicle can access the information assistance system 200 with a user interface that is generated in the mobile electronic device.

In one example of operation with the information assistance system 200, an occupant in the vehicle generates a request for a museum in a predetermined geographic region, such as requesting a museum in a particular city. The input can include a spoken query about the museum, and additionally an input gesture, such as a circle or other shape that selects a region of a map displayed in the vehicle. The interpretation module 108 converts the spoken query and gesture input into the meaning representations corresponding to the query. The dialog manager 120 queries the context manager 116 and knowledge manager 124 to generate appropriate information about the meaning representations in the query, which in the example of the information assistance system 200 includes vehicle environment and services that are appropriate for use with a vehicle.

The application manager 128 decomposes the query using the context information from the dialog manager 120. The decomposed query includes individual queries that are formatted to conform to one or more of the local applications 256 and cloud applications 260. For example, to search for a museum, the application manager 128 can generate a search query for an internet search engine, which is one of the cloud applications 160. The context of the query includes a geographical limitation from the context manager 116, which can be used to query map data in a local navigation application 256. The application manager 128 composes the information about the museum with navigation information to identify a route for the vehicle to take to reach the museum. If the application manager finds multiple museums, the content presentation module 132 can present information about each museum to the user, and the user can input another query to select one of the museums.

The information assistance system 200 also generates indirect queries based on the context of the request from the user, and the knowledge manager 124 stores information specific to the operation of the vehicle that supports the original query to find a museum. For example, the application manager 128 receives contextual query information about the state of the vehicle, such as the fuel or battery charge level of the vehicle. The application manager 128 generates another query for the on-board diagnostic applications 256 to identify the fuel or charge level in the vehicle and to determine if the vehicle has sufficient range to reach the museum. If the vehicle requires additional fuel or electrical charging, then the application manager generates additional sub-queries to cloud services 260 to locate an appropriate fueling or charging location along the route to the museum. The information assistance system 200 generates the additional queries and information for the user without requiring the user to request the location of a fueling or charging station expressly. Thus, the information assistance system 200 provides contextual assistance to the user that integrates multiple local and cloud-based information applications in a seamless manner, and provides contextual assistance without requiring a direct request from the user.

In the example of FIG. 2, the local services include software applications and data that are stored within one or more digital data storage devices within the vehicle. The local services in the information assistance system 200 include navigation with an in-vehicle global positioning system (GPS) and locally stored map data, music, calendar functions, and in-vehicle control and diagnostic software. The locally stored applications 256 include applications that should be available even if the vehicle is unable to connect to a wireless data network to access the network services 260.

The application management module 128 selectively decomposes queries to the information assistance system 200 to access only the locally available applications 256 when the network services 260 are unavailable. For example, the information assistance system 200 can still respond to requests for directions that are provided through the local navigation application, and can alert the user if the vehicle requires additional fuel or an electrical charge in order to reach a selected destination. In some embodiments, if the cloud-based services 260 are not available, the application manager 128 does not generate queries for the nearest fuel or charging station if that information is stored in a remote server instead of the vehicle. Some important and stable information such as locations of gas station near the current route can be pre-fetched and stored for the situations when no cloud services are available.

Figure 3:
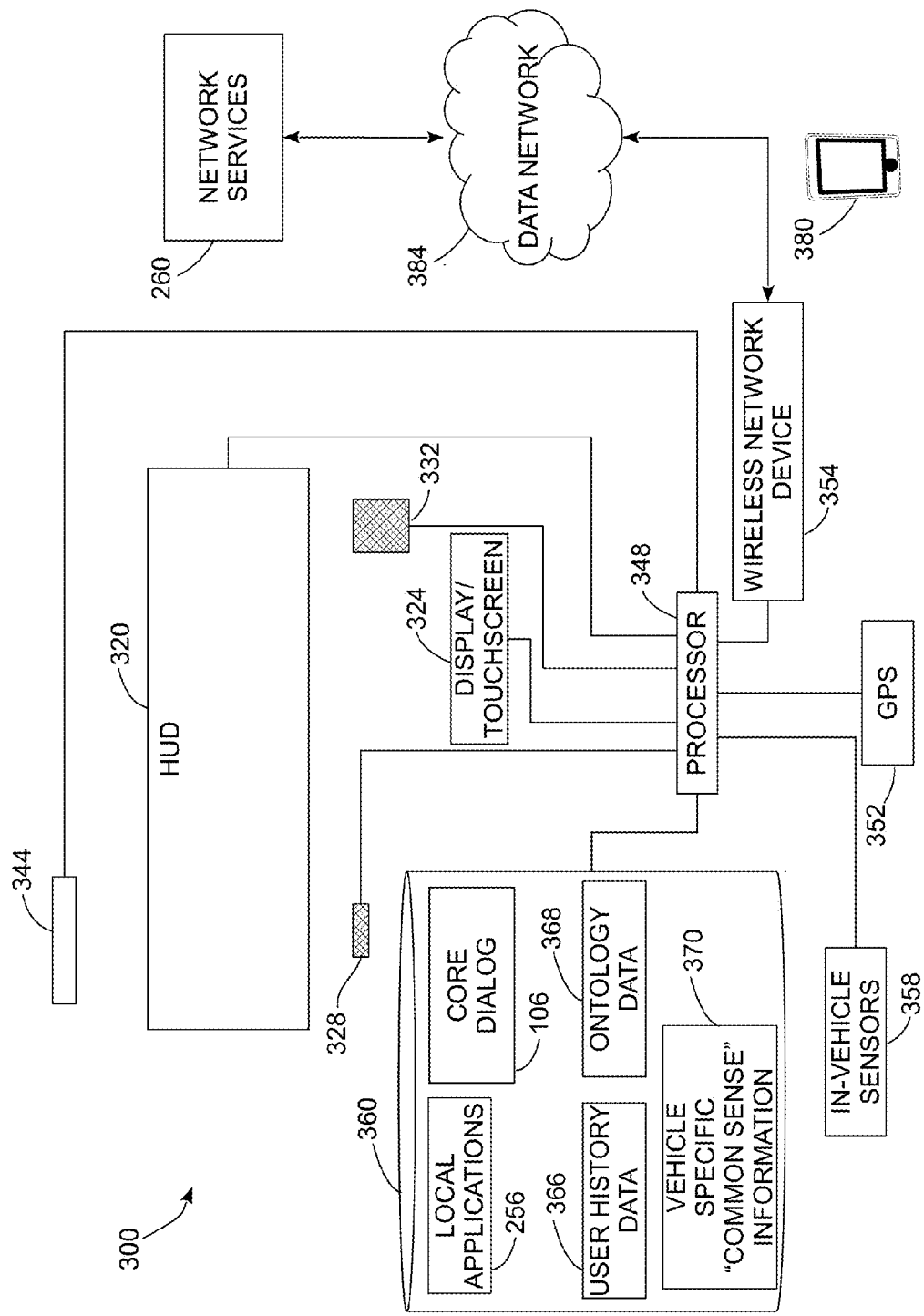
FIG. 3 is a schematic diagram of an embodiment of the intelligent assistance system of FIG. 1 and FIG. 2 in a vehicle.

FIG. 3 depicts an embodiment of an information assistance system 300 that includes the information assistance system components that are depicted in FIG. 1 and FIG. 2. The system 300 is embodied as an in-vehicle driver assistance system that is configured to provide functionality of use to an operator and occupants of a motor vehicle. The system 300 includes a digital processor 348 that is operatively connected to a memory 360, a plurality of data input devices, a plurality of data output devices, in-vehicle sensors 358, a global positioning system (GPS) receiver 352, and a wireless network device 354. The system 300 includes the plurality of data input devices including a microphone 328, depth camera 344, and a touch-input device 324 that is integrated with a visual display such as an LCD or organic LED (OLED) display. The depth camera 344 captures movement of a driver or other vehicle occupant including hand gestures, head movement, eye movement, and facial expressions. The touch-input device 324 receives simple input such as finger-press inputs for a touchscreen user interface and optionally receives single and multi-finger gestures. The system 300 includes the plurality of data output devices including a head-up display (HUD) 320 that is integrated with a windshield in the vehicle, audio speakers 332, and the output display 324.

The in-vehicle sensors 358 include sensors that are typically incorporated into motor vehicles to monitor the operation of the vehicle including, but not limited to, engine temperature sensors, fuel gauge sensors, tire pressure sensors, oil pressure sensors, backup cameras, speedometers, tachometers, and the like. The in-vehicle sensors 358 provide information about the operating state and operating conditions of the vehicle that are made available to the processor 348 through a communication link such as I$^2$C or CANBus. One or more of the local software applications 256 enable an information assistance system to retrieve data from the in-vehicle sensors 358 and use the data to respond to client requests during operation of the vehicle. FIG. 3 also depicts the GPS device 352 is that receives radio signals from a network of satellites, terrestrial radio transmitters, or a combination thereof to generate geographic location data of the vehicle. Data from the GPS 352 can also indicate a speed and direction of travel of the vehicle. The GPS 352 optionally includes accelerometers, gyroscopes, compasses, and other sensors that generate additional information about the location, orientation, speed, and direction of travel for the vehicle.

The wireless network device 354 includes one or more wireless network transceivers that are configured to communicate with the remote network services 260 through an external data network 384, such as a wireless local area network (WLAN) or wireless wide area network (WWAN). In the embodiment of FIG. 3, the wireless network device 354 is also configured to communicate with a mobile electronic device 380, such as a smartphone, tablet computer, wearable computing device, or mobile personal computer (PC). In one configuration, the mobile electronic device 380 provides data services to the system 300 in the same manner as the remote network services 260. Examples of WLAN transceivers include, but are not limited to, wireless transceivers in the 802.11 family of protocols, Bluetooth transceivers, and ultra-wideband transceivers. Examples of WWAN transceivers include, but are not limited to, EDGE, EVDO, LTE and other 3G and 4G WWAN transceivers. In some embodiments, the processor 348 and wireless network device 354 communicate with the mobile electronic device 380, computing devices in the data network 384, and network services 260 using the well-known TCP/IP and UDP/IP protocol families.

In the system 300, the processor 348 includes, for example, one or more digital microprocessor cores from the x86, ARM, MIPS, PowerPC or other suitable microarchitectures. In some embodiments, the processor 348 further includes a graphical processing unit (GPU) that produces two-dimensional and three-dimensional display graphics, a digital signal processor (DSP) or other audio processing device for the recording and generation of audio data, and one or more input-output (I/O) devices for communication with components in the vehicle including, but not limited to, the input devices, output devices, GPS 352, in-vehicle sensors 358, and wireless network device 354.

In the system 300, the memory 360 includes one or more digital data storage devices such as random access memory (RAM), solid-state data storage devices including NAND flash, and other suitable data storage devices such as magnetic or optical data storage media. As depicted in FIG. 3, the memory 360 stores program instruction data for one or more local applications 256, the core dialog 106 that is depicted in FIG. 1 and FIG. 2, a history of user data 366, ontology data 368, and predetermined "common sense" information that are specified for the vehicle 370. The local applications 256 include one or more software programs that are executed by the processor 348 to provide services in the vehicle. As described above, examples of local applications include, but are not limited to, vehicle information management applications, navigation applications with map data stored in the memory 360, entertainment applications, personal information management (PIM) applications, web browsers, roadside assistance applications, and the like.

The core dialog 106 includes software components from the core dialog 106 that is depicted in FIG. 2, including the interpretation module 108, context manager 116, dialog manager 120, knowledge manager 124, application manager 128, and content presentation module 132. As described above, in some embodiments a portion of the core dialog 106 is implemented in one or more remote services 260 that interact with core dialog components that are executed by the processor 348.

The user history data 366 include a stored history of client requests that have been made by a user of the system 300, personal preference data for the user, and other information pertaining to previous interactions between a user and the in-vehicle information system 300. In some embodiments, the user history data 366 are used for machine-learning processes to improve the accuracy of interpreting spoken commands, written commands, and input gestures that the user provides for a client request.

The ontology data 368 include one or more predetermined ontologies that are selected for relevance to the operation of the information assistance system 300 in the context of an in-vehicle assistance system. For example, the ontology data 368 include one or more ontologies that specify properties and relationships for the vehicle, points of interest and navigation for the vehicle, traffic and weather information for the environment around the vehicle, and information and entertainment services that are provided to the user of the vehicle. In the core dialog system 106, the context manager 116 and knowledge manager 124 access the predetermined ontologies 368 to, for example, extract service request elements from a client request, select services that should receive service requests based on the service request elements, and select between multiple service responses if the service responses are ambiguous or contradictory. The processor 348 optionally updates the ontologies 368 with new entity and relationship data based on the user history data 366 that are collected during operation of the system 300.

The common sense information 370 include relevant data that are specific to the vehicle that uses the information assistance system 300 and the tasks of operating the vehicle. For example, "common sense" information pertaining to the vehicle include recommended safe operating modes for the vehicle such as maximum recommended speeds in different driving conditions, the turning radius of the vehicle, the braking distance of the vehicle at different speeds, and the like. Other common sense information about the vehicle includes different operating parameters for the vehicle such as recommended types of fuel to use with the vehicle, engine temperature ranges, tire pressure levels, battery voltages, and the like. During operation of the vehicle, the context manager 116 receives sensor data corresponding to one or more parameters that are part of the common sense information 370, and the dialog manager 120 adjusts the operation of the information assistance system 300 using the current information from the context manager 116 and the stored domain and common sense information 370 from the knowledge manager to present recommendations to the driver of the vehicle.

The information assistance system 300 is configured to receive a client request, generate a plurality of request elements from the client request, send service requests to both local application services 256 and the remote network services 260, and to generate an output including output elements from one or more data service responses that are received in response to the service requests. As used herein, a client request refers to data that are received from a human operator who requests information from the information assistance system. The client request optionally includes spoken voice commands, text inputs, recorded gestures, and touch input from the user. As used herein, a service request element refers to a particular action that can be performed by hardware and software in the information assistance system as part of generating a response to the client request. A client request includes a plurality of service request elements that form the basis for a plurality of service requests. Each service requests is formatted for a particular data service, such as a local program 256 or remote network service 260. The system 300 receives a plurality of data service responses for the service requests, and uses the data service responses to generate output elements that form an output message for the user in response to the client request. The system 300 processes client requests that include multiple request elements and performs automated synchronization of data service requests and integration of data from multiple data services to provide responses to complex and context sensitive client requests in a manner that is intuitive to the user.

Figure 4:
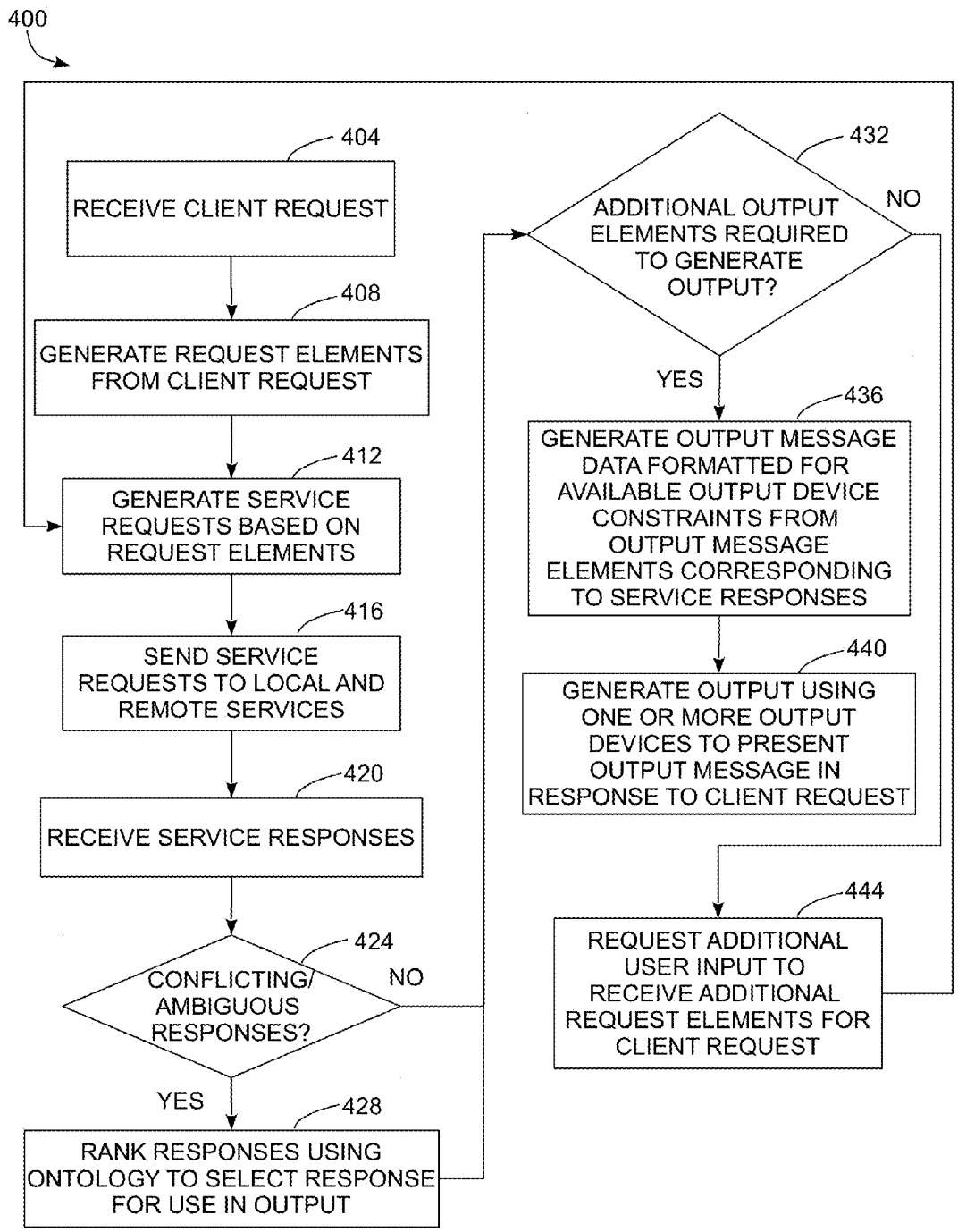
FIG. 4 is a block diagram of a process for generating a response to a client request in the information assistance systems of FIG. 1-FIG. 3.
Figure 5:
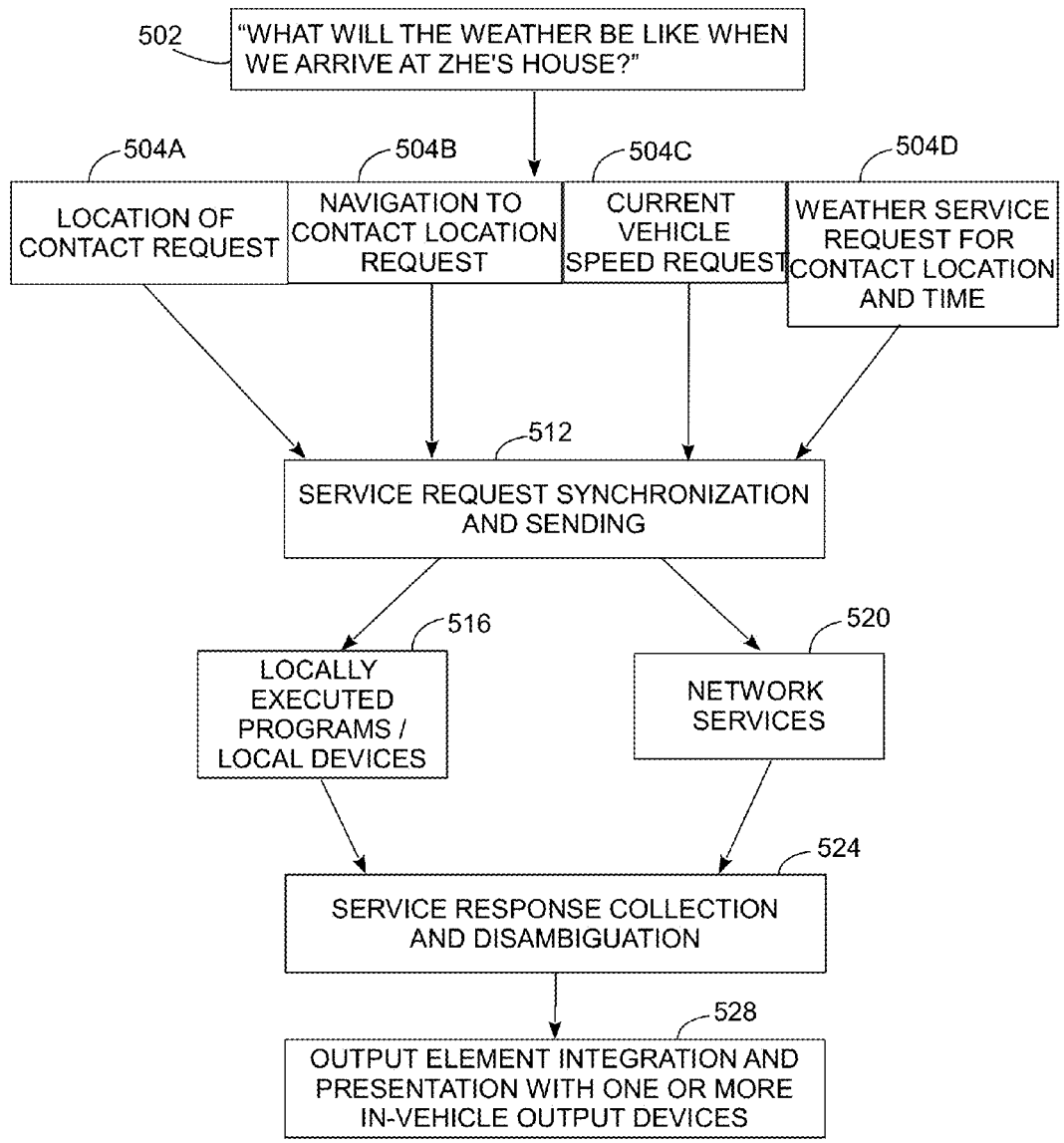
FIG. 5 is an illustrative example of a client request and response process with an intelligent assistance system.

FIG. 4 depicts a process 400 for processing a client request in an information assistance system, such as the systems depicted above in FIG. 1-FIG. 3. In the discussion below, a reference to the process 400 performing an action or function refers to a processor, such as the processor 348 in the system 300, executing stored program instructions to operate one or more devices in the in information assistance system to perform the action or function. The process 400 is described in conjunction with the information assistance systems of FIG. 1-FIG. 3 for illustrative purposes. FIG. 5 depicts an illustrative example of processing that is performed for a client request in conjunction with the process 400 and the systems 100, 200, and 300.

The process 400 begins as the system 300 receives a single client request (block 404). In the, system 300, a user generates a client request using one or more input devices including the a voice-activated request through the microphone 328, a gesture input that is entered through the touchscreen 324 or the depth camera 344, or user input that is directed from the mobile device 380 to the processor 348. As depicted in FIG. 1, the interpretation module 108 receives user input from one or more input devices, and the dialog interaction manager 120 combines inputs from multiple devices for client requests for multimodal input. The single client request includes multiple express or implied commands or queries for information, and the client request can optionally include a sequence of commands or conditional commands. The in-vehicle information assistance system 300 processes client requests and presents a multimodal dialog based user interface to process a single client request with multiple request elements in an intuitive manner. As described in more detail below, the dialog interaction manager 120 optionally prompts the user for additional input if the information assistance system requires additional information to generate a response for a client request.

Process 400 continues as the information assistance system generates request elements from the client request data (block 408). The request elements correspond to individual actions that the information assistance system performs in response to receiving the client request. In the system 100, the dialog interaction manager 120 uses the ontologies in the knowledge manager 124 in conjunction with contextual information that the context manager 116 collects from user input, from one or more sensors in the vehicle, and from connected web services to identify individual actions that an information assistance system performs to generate an appropriate response to the request.

FIG. 5 depicts an example of a human-readable form of a single client request 502 that requests predicted weather at the time of arrival at Zhe's home address. In the example of FIG. 5, Zhe is a listed contact of the user in the information assistance system or in a social network service that provides the home address data to the information assistance system. The information assistance system decomposes information in the original client request into a plurality of request elements using natural language processing and other techniques to convert the text of the original request into machine-readable request elements. Referring to the systems 100 and 300, the processor 348 refers to one or more ontologies 368 and user history data 366 to extract terms from the original query in a context that is relevant to the user using the interpretation module 108. For example, the system 300 identifies the proper name "Zhe" corresponding to a contact in, for example, an address book or an online social networking service 300. The term "weather" is linked to a request for weather information, but the request is predicated upon both a spatial component (location of Zhe's house), and a temporal component (time of arrival). If the name Zhe is ambiguous since the user may be in contact with more than one person named "Zhe," then the system 300 optionally refers to the user history data 366 to select the contact named Zhe who was most recently identified in a non-ambiguous manner, based on conversational context. In another configuration, the system 300 prompts the user for additional information to identify "Zhe" with more specificity. In the example of FIG. 5, the request elements include a location of the contact request 504A, navigation to contact location request 504B, current vehicle speed request 504C, and a weather service request for the contact location at the time of arrival 504D.

Referring again to FIG. 4, the information assistance system generates service requests based on the generated request elements (block 412). In the system 100, the application assistance manager 128 sends requests that correspond to the request elements to one or more of the local applications 156 in the information system 100 or to external services 160 through a data network. In the embodiment of the system 300 in FIG. 3, the processor 348 executes stored program instructions for one or more of the local applications 256 that are stored in the memory 360 or generates a network request for a selected network service 260. The service request generation process produces the service requests in a format that is compatible with the selected service. For example, a service request to an online social network service 260 may be formatted as a Representational state transfer (REST) query. For a locally executed application, the processor 348 formats a service request in a format that is compatible with the local application. For example, a utility program that queries an in-vehicle sensor 358 accepts a text string in a predetermined format as an argument to specify the service request to a particular sensor in the vehicle, such as a speedometer.

In one configuration, the processor 348 selects the local application 256 or network service 260 with reference to the entities and relationships that are defined the request elements using the ontologies 368. For example, a request element for the location of a contact is sent to a corresponding social network service when the entity for the contact in the ontology indicates that additional contact data are stored in the external social network service. In FIG. 5, the service request for a weather prediction 504D is sent to an external weather service such as a website of the National Weather Service or other suitable online weather service. In some instances, the ontology indicates that a service request can be sent to multiple services. For example, during process 400 the processor 348 can generate service requests for the current vehicle speed request element 504C that are directed to both the in-vehicle speedometer sensor 358 and the GPS receiver 352 in FIG. 3.

Process 400 continues as the processor 348 sends service requests to both local and remote services (block 416). In the system 100, the application assistance manager 128 synchronizes the sending of the service requests in situations where one service requests depends on data that are included in a response from another service request. For example, to generate an appropriate request for a weather report, the information assistance system requires both geographic information corresponding to the destination of the vehicle and an estimated time of arrival at the location. In the system 300, the processor 348 synchronizes the sending of the service requests with the application assistance manager 128 to ensure that any required data for a service request are received before the service request is sent.

In the example of FIG. 5, the request element 504A is generated to request the location of Zhe's home address. The navigation to contact location request element 504B depends upon the results of the location from the request element 504A. The navigation route results from the request element 504B and the current vehicle speed request 504C provide a basis to generate an estimated time of arrival at the destination. The weather service request element 504D depends upon both the results of the location request 504A and an estimated time of arrival from the navigation and current vehicle speed requests 504B and 504C, respectively. FIG. 5 depicts service request sending module 512 that synchronizes the service requests and sends some service requests to locally executed programs 516 and other requests to network services 520. In situations where multiple service requests do not have dependencies on the results of other service requests, the information assistance system sends the service requests in any order and optionally sends service requests in parallel to reduce the total time required to receive responses to the service requests.

Referring again to FIG. 4, the process 400 continues as the information assistance system receives service responses that include response data corresponding to the message request elements in each of the service requests (block 420). In some instances, one or more responses to service requests may include conflicting or ambiguous response data (block 424). If multiple conflicting service responses are received, then the information assistance system ranks the responses using the ontology to select one of the responses (block 428). For example, FIG. 5 depicts the service request corresponding to the current vehicle speed request element 504C, and a service response collection and disambiguation module 524 that selects a service response to a request element if two or more conflicting responses are received. In the system 300, the processor 348 sends service requests to a speedometer in the in-vehicle sensors 358 and the GPS 352. If the indicated vehicle speeds from the two service responses differ by a significant margin (e.g. by more than 5 miles per hour), then the processor 348 assigns a ranking to the responses using the ontology data 368 and the knowledge manager 124. For example, in one configuration the knowledge manager 124 indicates that vehicle speed measurements from the speedometer 358 take precedence over vehicle speed measurements from the GPS 352.

During process 400, if some service responses remain ambiguous, if some service requests fail to return results, or if the information assistance system requires additional information from the user to complete a response to an initial request (block 432), then process 400 generates a request for additional user input to generate additional request elements (block 444). In the system 300, the processor 348 generates an output using one or more of the output devices including the speakers 332, HUD 320, and console display device 324. The output optionally includes information that is included in a service response to enable the user to refine the scope of a request. For example, if a social network service 260 returns two different addresses for Zhe's home address, then the information assistance system 300 presents both addresses to the user and prompts for the user to select one of the addresses. The user selects one of the addresses using an input device in the vehicle and the process 400 returns to the processing described above with reference to block 412 using the selected address as the confirmed response to the corresponding request element for Zhe's home address.

In the system 300, the dialog manager 120 generates multimodal interactions with the user as part of a dialog to present information to the user and receive input from the user. For example, the dialog manager 120 and content presentation modules 132 generate an audible request for the user to specify the correct home address with the speakers 332. The dialog manager 120 uses the ontology data in the knowledge manager 124 to identify that the home address entity in the request element is a geographic entity that is amenable to display on a map. In response, the processor 348 retrieves map data and generates a graphical display of a map with graphical depictions of the two addresses using the display 324. The user enters touch input to select a graphical icon corresponding to the address or enters an input gesture to circle a geographic region of the correct address. Under different operating conditions for the vehicle and the user, such as when the vehicle is in motion or the user is not talking to other passengers or on the phone, the dialog manager 120 receives context information about the vehicle from the context manager 116 and generates speech synthesized output for the two addresses based on rules from the knowledge manager 124. The user utters a spoken selection of the correct address through the microphone 328. Thus, the system 300 enables intuitive dialog interaction with the user through multiple input and output devices based on the context of the dialog and the operating state of the vehicle.

Process 400 continues with integration of the service response data into an output message that is formatted for output using constraints for available output devices in the information assistance system (block 436). During process 400, the output response includes one or more output elements that incorporate data from one or more of the services responses. In one embodiment, the output to the client request includes an output element corresponding to each of the request elements that are identified in the original client request. In another configuration, the output only includes data corresponding to a portion of the service responses. In the systems 300 and 100, the dialog interaction manager 120 in the core dialog system 106 generates an output message that includes the data from one or more of the service responses. In one embodiment, the knowledge manager 124 includes one or more text templates, graphics icons, or recorded audio responses that can be used to generate a formatted output using text, graphics, and sounds.

Using the example of FIG. 5, an output element integration module 528 generates the following text string output in response to the original client request: "The weather at Zhe's address of 1234 Any Street, Palo Alto, Calif. for your arrival at 3:45 PM will be sunny with a temperature of 28° C." The formatted output message is presented to the user using one or more output devices in the vehicle. The formatted output message integrates service response data from the contact location request element 504A, weather service request element 504D, and includes the estimated time of arrival that is derived from the navigation service request 504B and current vehicle speed request 504C. The information assistance system 300 displays the text using the HUD 320 or display 324 in one embodiment, while a voice synthesis module generates an audio output for the text using the speakers 332 in another embodiment. In another embodiment, the information assistance system retrieves graphical icons corresponding to the predicted weather conditions from the memory 360 or downloads the icons from an online weather service 260 to produce a simple graphical depiction of the predicted weather. The graphical output for the predicted weather is optionally displayed over a map depicting the address of the destination.

After the generation of the output message, one or more output devices in the information assistance system present the output message to the user (block 440). During process 400, the output message is presented to the user based on constraints for the current operating state of the vehicle and other context data. In the system 100 the context manager 116 receives the sensor data from the in-vehicle sensors 358 that provide contextual information about the operating state of the vehicle. For example, if a speedometer sensor indicates if the vehicle is moving or is stationary, and a brake sensor indicates if the driver is applying the brakes. The dialog manager 120 presents dialog information to the user based on predetermined rules for response output and requests for user input using predetermined rules from the knowledge manager 124 and the current state of the vehicle from the context manager 116. The content presentation manager 132 generates the final output message in a format that corresponds to the predetermined rules from the knowledge manager 124. To synthesize a response to the user with the output content from multiple service providers, the content presentation manager 132 selects and structures the sentence content based on the context and user states and decides whether it will be presented in a single or multiple turns. It would further perform word selection and arrangement, and sentence order and length in a single turn to provide the driver easily understood messages. In some cases, it would also select funny or witty words from the knowledge base to form sentences for the driver so that the driver will be delight to hear. For example, if the context manager 116 identifies that the vehicle is in motion at any speed or if the vehicle is in motion at greater than a predetermined speed, then the dialog manager 120 uses predetermined rules in the knowledge manager 124 to determine that the output should be generated as an audio message through the speakers 332. The generation of an audio output message reduces visual distractions for the driver of the vehicle when the vehicle is in motion. In another situation, the context manager 116 receives sensor data indicating that the vehicle is halted with the brake applied. The dialog manager 120 uses the predetermined rules in the knowledge manager 124 to determine that the output message should be presented visually using the console display 324 or HUD 320 when the vehicle is halted. In some embodiments, the user stores preferences for the presentation of output messages in the memory 360, and the context manager 116 selects output constraints for the output messages using the stored user preferences.

Figure 6:
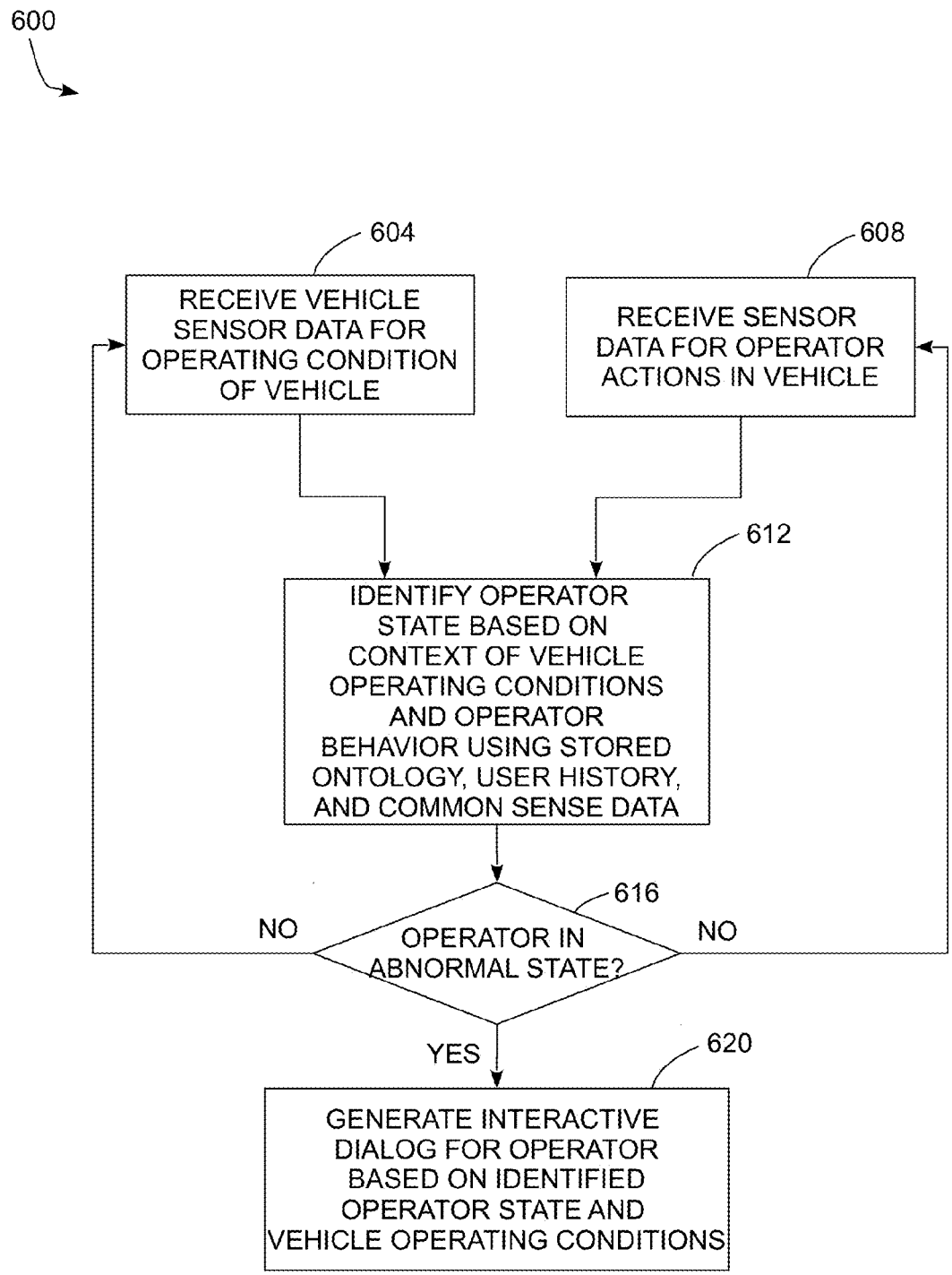
FIG. 6 is a block diagram of a process for adjusting the operation of the information assistance systems of FIG. 1-FIG. 3 based on observed behavior of a human user.

FIG. 6 depicts a process 600 for generating a dialog with an information assistance system in a vehicle based on the operating conditions of the vehicle and observed actions of an operator in the vehicle. In the discussion below, a reference to the process 600 performing an action or function refers to a processor, such as the processor 348 in the system 300, executing stored program instructions to operate one or more devices in the in information assistance system to perform the action or function. The process 600 is described in conjunction with the information assistance systems of FIG. 1-FIG. 3 for illustrative purposes.

During process 600, the information assistance system 300 receives sensor data corresponding to both the operating condition of the vehicle (block 604), and actions that the driver takes while operating the vehicle (block 608). The in-vehicle sensors 358 and GPS 352, generate data corresponding to the state of the vehicle, such as the speed, direction of travel, and location of the vehicle. In some vehicles, additional information from external sensors provides information about weather and road conditions around the vehicle. The system 300 optionally retrieves traffic and weather reports from one or more of the network services 260 corresponding to the region around the vehicle. The information assistance system 300 also uses sensors in the vehicle to record the actions taken by the driver. For example, the depth camera 344 records input gestures from the operator, but can also record head movements, eye movements, facial expressions, and hand movements for the operator while operating the vehicle. In other embodiments, additional sensors including infrared and ultrasonic sensors record the actions of the driver. The in-vehicle sensors 358 include sensors that are connected to the accelerator, brake, and steering wheel to record patterns of acceleration, braking, and steering that the operator applies to the vehicle.

Process 600 continues as the information assistance system 300 identifies a state of the operator based on the context data received for both the operating state of the vehicle and the actions of the driver (block 612). In the system 300, the processor 348 receives the sensor data and the context manager 116 generates context information for both the operating state of the vehicle and the actions of the driver. The dialog manager 120 then identifies a state for the driver using the stored user history data 366, ontology data 368, and common sense vehicle information 370 in the knowledge manager 124. The state of the driver is identified not only by the actions of the driver, but also by the state of the vehicle and conditions around the vehicle. For example, an operator who applies the accelerator to run the vehicle at a constant rate of 100 Kilometers per hour and seers the vehicle in a straight line on a highway in favorable weather exhibits actions that may be considered normal for operating the vehicle. The same actions may be considered abnormal if the vehicle is in a congested urban environment with twisting roads.

In the system 300, the dialog manager 120 and knowledge manager 124 use the stored history of actions for the driver 366, predetermined ontology data that include general guidelines for driving actions in different driving conditions 368, and the "common sense" information that are specific to the vehicle 370 to identify if the driver is in an abnormal state (block 616). The process 600 returns to the processing described above with reference to blocks 604 and 608 while the driver remains in a normal state.

If the information assistance system 300 identifies that the driver is in an abnormal state (block 616), then the dialog manager 120 and content presentation module 132 generate an output dialog that alerts the driver to the abnormal state (block 620). In the system 300, the output alert is generated using, for example, an audio announcement that is generated with the speakers 332 and a visual cue that is presented with the HUD 320. The information assistance system 300 generates the alert in a manner that alerts the driver to his or her abnormal state but does not present an undue distraction if the vehicle is in motion. As part of an interactive dialog, the information assistance system 300 also prompts for input from the driver to acknowledge and correct for the abnormal state. For example, if the driver drives the vehicle at a higher than recommended speed, the dialog manager 120 presents an output to alert the driver to slow the vehicle. The operator can acknowledge the alert directly, and apply brakes to slow the vehicle to a recommended speed.

One example of a driver state for which the system 300 generates a dialog during the process 600 is a state of drowsiness for the driver. In the system 300, identified user behavior that may correspond to drowsiness includes abnormally low head and eye movement in the video data from the camera 344, and erratic acceleration/braking and steering patterns. The processor 348 uses the identified behavior patterns for the driver from the context manager in conjunction with stored data corresponding to expected driver behavior with the knowledge manager 124 to determine if the dialog manager 120 should generate an output for the drowsy driver. Since different drivers may have different behavior patterns when asleep or awake, the knowledge manager 124 optionally accesses recorded behavior patterns for the driver in the stored user history data 366 to identify if the presently detected behavior patterns are abnormal for the operator.

The in-vehicle sensors 358 also generate data about the state of the vehicle, such as the time of day from a clock and the route of travel for the vehicle from the GPS 352 or navigation application. For example, if the clock or light sensors in the vehicle indicate that the vehicle is traveling during dark conditions or if the navigation application indicates a route of travel that is fairly flat and straight, then the likelihood of the environment around the vehicle promoting drowsiness in the driver is greater than if the vehicle is operating in daylight with a route that requires continuous attention from the driver. In the memory 360, the common sense information 370 stores data corresponding to different driving conditions for the vehicle including time of day and information.

The dialog manager 120 receives the contextual information from the context manager 116 for both the operator behavior and vehicle state. The dialog manager 120 determines if an output should be generated for a drowsy driver using the user history data 366 and vehicle rules in the common sense information 370 in the knowledge manager 124. The dialog manager 124 generates an appropriate dialog for a drowsy driver using the content presentation module 132 and the input and output devices in the vehicle. For example, in one configuration the dialog manager 120, presentation module 132, and processor 348 produce an audible alarm through the speakers 332. The processor 348 may be connected to additional devices in the vehicle including, for example, interior lights, air-conditioning, and windows that are operated to bring the driver to a state of wakefulness. The dialog manager 120 further requires that the operator provide an affirmative input response to the alarms to confirm that the operator is awake. The dialog manager 120 also uses an ontology in the knowledge manager 124 to identify one or more nearby locations where the vehicle can stop using geographic and navigation data from an online navigation service 260 or a local navigation application 256. The dialog manager 120 presents suggestions for stopping locations to the operator.

While operator drowsiness is one state that the information assistance system monitors, the system 300 can generate interactive dialogs to alert the driver to other states including deviating significantly above or below a speed limit, aggressive driving, and potentially treacherous driving conditions where the driver should drive with additional caution. The information assistance system 300 monitors the actions from the driver after presenting an alert to ensure that the driver changes his or her behavior after receiving the alerts, or to generate additional alerts.

It will be appreciated that variants of the above-disclosed and other features and functions, or alternatives thereof, may be desirably combined into many other different systems, applications or methods. For example, while the foregoing embodiments present an example of an in-vehicle information assistance system, the information assistance system can be integrated with a wide variety of electronic devices, including mobile electronic communication devices and power tools. The connection with internet-enabled home appliances from the vehicle may further provide the driver a dynamic request for searching and shopping for items, such as grocery, or part suppliers. Various presently unforeseen or unanticipated alternatives, modifications, variations or improvements may be subsequently made by those skilled in the art that are also intended to be encompassed by the following claims.

What is claimed:

1. A method of providing information assistance services comprising:
   receiving a single client request with a processor;
   generating a plurality of request elements with reference to the single client request and at least one ontology stored in a memory operatively connected to the processor;
   generating a plurality of service requests with the processor, the plurality of service requests corresponding to the plurality of request elements;
   sending at least one generated service request in the plurality of service requests to at least one data service provider in a first plurality of data service providers that are software programs executed by the processor;
   sending at least one other generated service request in the plurality of service requests to at least one data service provider in a second plurality of data service providers that are external data service providers communicatively coupled to the processor through a data network;
   receiving a plurality of service responses including a service response from each data service provider in the first plurality of data service providers and the second plurality of data service providers that received a generated service request;
   generating at least one output message element corresponding to the service responses received from the service providers;
   generating output message data with reference to the at least one output message element, the generating of the output message data further comprising:
      associating a first service response in the plurality of service responses to a first output message element in the plurality of output message elements with the processor;
      associating a second service response in the plurality of service responses to the first output message element with the processor, the second service response being different than the first service response;
      generating a ranking of the first service response and the second service response with reference to the at least one ontology stored in the memory; and
      associating only one of the first service response or the second service response with the first output message element with reference to the ranking; and
   sending the output message data to at least one output device that is operatively connected to the processor to produce a response to the client request.

2. The method of claim 1, the sending of the data service requests further comprising:
   generating a classification for one request element in the plurality of request elements with the at least one ontology stored in the memory;
   identifying a data service provider in the first plurality of data service providers corresponding to the one request element with reference to a predetermined association between the classification and the plurality of data services providers; and
   sending a service request corresponding to the one request element to the identified data service provider.

3. The method of claim 1, the generation of the output further comprising:
   generating the output including at least one of text or graphics with a visual display device.

4. The method of claim 1, the generation of the output further comprising:
   generating the output including audio with an audio output device.

5. The method of claim 1 further comprising:
   receiving data corresponding to an environment in which the processor operates from a sensor operatively connected to the processor;
   selecting the at least one output device from a plurality of output devices with reference to the data from the sensor; and generating the output with the selected at least one output device.

6. The method of claim 5 further comprising:
receiving data from a speed sensor corresponding to a speed of motion of a device that includes the processor; and
generating the output with an audio output device in response to the data from the speedometer indicating that the speed of motion is greater than a predetermined threshold.

7. The method of claim 5 further comprising:
receiving data from a speed sensor corresponding to a speed of motion of a device that includes the processor; and
generating the output with a video output device in response to the data from the speedometer indicating that the speed of motion is less than a predetermined threshold.

8. The method of claim 1 further comprising:
generating another output with the at least one output device to request input corresponding to an additional request element corresponding to the client request;
receiving the input with a user input device;
identifying the additional request element in the input; and
generating the plurality of service requests corresponding to the plurality of request elements in the client request and the additional request element with the processor.

9. An information assistance system comprising:
at least one input device;
at least one output device;
a network device;
a memory configured to store:
at least one ontology include domain data corresponding to request elements in a client request and service requests corresponding to the request elements; and
stored program instructions for a plurality of software programs that are executed by the information assistance system; and
a processor operatively connected to the at least one input device, at least one output device, network device, and memory, the processor being configured to execute programmed instructions to:
receive a client request from the at least one input device;
generate a plurality of request elements with reference to the single client request and the at least one ontology;
generate a plurality of service requests corresponding to the plurality of request elements;
send at least one generated service request in the plurality of service requests to at least one software program in the plurality of software programs executed by the processor;
send at least one other generated service request in the plurality of service requests through a data network with the network device to at least one external data service provider in a plurality of data external data service providers;
receive a plurality of service responses including a service response from each software program in the plurality of software programs and each data service provider in the plurality of data service providers that received a generated service request;
generate at least one output message element corresponding to the service responses;
generate output message data with reference to the at least one output message element, the processor being further configured to:
associate a first service response in the plurality of service responses to a first output message element in the plurality of output message elements with the processor;
associate a second service response in the plurality of service responses to the first output message element with the processor, the second service response being different than the first service response;
generate a ranking of the first service response and the second service response with reference to the at least one ontology stored in the memory; and
associate only one of the first service response or the second service response with the first output message element with reference to the ranking; and
send the output message data to the at least one output device to produce a response to the client request.

10. The system of claim 9, the processor being further configured to:
generate a classification for one request element in the plurality of request elements with the at least one ontology stored in the memory;
identify a data service provider in the first plurality of data service providers corresponding to the one request element with reference to a predetermined association between the classification and the plurality of data services providers; and
send a service request corresponding to the one request element to the identified data service provider.

11. The system of claim 9 further comprising:
at least one sensor configured to generate data corresponding to an environment in which the processor operates; and
the processor being operatively connected to the at least one sensor and further configured to:
receive sensor data corresponding to the environment from the sensor;
select the at least one output device from a plurality of output devices with reference to the sensor data; and
generate the output with the selected at least one output device.

12. The system of claim 9 further comprising:
a first sensor integrated with a vehicle and configured to generate first sensor data corresponding to actions of a human driver of the vehicle;
a second integrated with the vehicle and configured to generate second sensor data corresponding to an operating state of the vehicle; and
the processor being integrated with the vehicle and operatively connected to the first sensor and the second sensor, the processor being further configured to:
receive the first sensor data and the second sensor data;
identify a state of the driver in response to the first sensor data, the second sensor data, and the at least one ontology stored in the memory;
generate an output message with reference to the identified state of the driver; and
send the output message data to at least one output device that is operatively connected to the processor to alert the driver to the identified state.

13. The system of claim 12, the processor being further configured to:
identify a state of drowsiness in the driver in response to the first sensor data indicating a lack of movement for the driver and the second sensor data indicating that the vehicle is traveling in dark conditions; and generate an audible alarm with an audio output device in the vehicle to alert the driver to the state of drowsiness.

\* \* \* \* \*